Nov. 26, 1957          A. H. IVERSEN            2,814,571
      PROCESS OF COATING CERAMIC WITH PYROPHORIC MOLYBDENUM
                     Filed Aug. 28, 1953
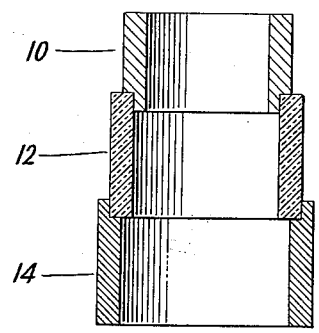
                                    INVENTOR
                             ARTHUR H. IVERSEN
                             BY
                                  ATTORNEY 
United States Patent Office 2,814,571
Patented Nov. 26, 1957

2,814,571
PROCESS OF COATING CERAMIC WITH PYROPHORIC MOLYBDENUM

Arthur H. Iversen, Kew Gardens, N. Y., assignor to Sylvania Electric Products, Inc., a corporation of Massachusetts Application August 28, 1953, Serial No. 377,177

2 Claims. (Cl. 117—22)

This invention relates to a ceramic-to-metal seal. More particularly it relates to an improved method for making such seals with molybdenum iron and molybdenum manganese powders in accordance with the so-called Telefunken technique.

Much work has been done in recent years in the field of metal-to-ceramic seals. Of the various techniques which have been developed the most universally used commercially is based on the use of molybdenum powder either in combination with iron or manganese. In accordance with this method, for example, 96% of a molybdenum powder having approximately three micron particle size is thoroughly mixed with 4% of a carbonyl iron type powder having approximately three micron particle size. These are then added to a nitro cellulose binder in the ratio of about 40 grams of powder to 100 grams of 10% binder; that is, 10% nitro cellulose and 90% ethyl acetate. The resulting product usually has a consistency of a thin paste. The mixture is then applied to the ceramic body at the point at which the seal is to take place. The mixture is applied as evenly as possible, preferably with a camel's-hair brush and usually to a thickness of not greater than 0.005". Coated parts are then usually placed in a small hydrogen or nitrogen atmosphere furnace and raised to a temperature of about 1350° C. which is maintained for approximately one half hour at which time the parts are allowed to cool to room temperature. Although this process has been used quite successfully it has certain disadvantages in that it must be used with a ceramic material which can withstand temperatures in the neighborhood of 1350–1400° C., before glazing. Since this temperature is in the neighborhood of the glazing temperature of a good number of ceramics the process cannot be used with low glazing point ceramics. Zircon ceramics, for example, are materially glazed when fired at 1350° C. Furthermore, some fosterites and steatites have melting points below 1350° C. and consequently would melt in furnaces maintained at a temperature of 1350° C.

It is, accordingly, an object of this invention to modify the process and make it adaptable for use with lower melting point or glazing point ceramics.

It is a further object of this invention to improve this method of making metal-to-ceramic seals so as to make it more universally applicable to all types of ceramic materials.

It is a further object of this invention to improve the technique of metallized ceramics so as to insure vacuum tight seals.

In accordance with this invention it has been found that these objects and other advantages incidental thereto can be obtained by making use of pyrophoric molybdenum powder; that is to say, a powder whose average particle size is at least 1.5 microns rather than the 3.3 microns of the finest commercial grade of powders.

In the drawing which illustrates a preferred embodiment of this invention Figure 1 is a sectional view showing a typical inside and outside seal which can be made between an inner metal sleeve, a ceramic cylinder and an outer metal sleeve. In order to make the best type of seal possible and make it vacuum tight it is normally desirable to keep the ceramic form in a state of compression whenever possible. Therefore, when making a join such as shown in Figure 1 it is normally advisable to make part 10 from a metal having a lower coefficient of expansion than the ceramic 12 and the part 14 from one having a higher coefficient of expansion. Because of the difference in expansion coefficients the gap between the metal and the ceramic will increase as the parts are heated and the solder will fill this gap and in the ensuing process a compression seal will be formed.

The process of this invention is in its essentials substantially identical with that of the prior art, the only difference between the two being that in accordance with this invention the molybdenum powder used to make the molybdenum iron paste material is one in which the particle size is the average of 1.5 or less. That is to say, what is commonly referred to as a pyrophoric powder whereas the commercial molybdenum powder normally used is one whose particle size averages about 3.5. With a powder having this fineness and being pyrophoric in nature it has been found possible to lower the sintering temperature which is required. This temperature can be lowered 200° C. and thereby makes it possible to use ceramics whose glazing temperature is substantially below 1350° C. At temperatures of about 1350° C. which are necessary with the prior art materials even the zircon ceramics sometimes glaze which weakens and deforms the ceramic and thus makes it undesirable to make use of these materials. When using pyrophoric powders, however, there is no danger of glazing a zircon ceramic. Furthermore, it has been found that by using these materials the seal reliability is greatly increased. This, it is believed, is due to the fact that poor seals are frequently caused by poor sintering of the larger particle size molybdenum in the large particle size range of the powder. The average size is large and the particle size distribution is very wide for commercial molybdenum whereas when dealing with pyrophoric molybdenum both size and distribution are small and therefore sintering conditions are much more uniform and it is therefore possible to obtain more reliable seals.

Since the process is substantially the same as the prior art any of the known proportions in which molybdenum and iron powders are mixed or molybdenum and manganese powders are mixed in order to form the paste may be used for this purpose including those in which other metals such as nickel powders are included in order to provide a special base for brazing materials such as silver, silver alloys and copper.

In preparing the material to make it ready for application to the ceramic at the point at which the seal is to take place it is usually customary to mix the iron and molybdenum powder or the molybdenum and manganese powder in accordance with a desired proportion. In one case, for example, a mixture of 96% of molybdenum powder is mixed with 4% of iron. To this one may add a nitro cellulose binder in the ratio of 40 grams of powder to 100 grams of 10% binder, such as, for example, 10% nitro cellulose in 90% ethyl acetate. The resulting product will have the consistency of a very thin paint which can then be applied to the ceramic form. In some cases it has been found most desirable to make use of a camel's-hair brush for this purpose. Whatever paste composition is made use of, it is usually desirable that the metal paste of molybdenum powder has a good brushing quality and be one which will dry in a relatively short time since the intrinsically heavy powder will precipitate readily and therefore may lead to uneven thickness of the metal coating. After the paste has been applied to the ceramic body the structure can then be introduced into a firing furnace having a controlled atmosphere and preferably one at which the temperature can be held quite constant. With the powders of the prior art it was heretofore considered essential that a temperature of about 1350° C. be used. At this temperature a noticeable reaction would take place between the molybdenum powder and the ceramic. With the paste using the pyrophoric powders, however, the temperature which is preferred is one of 1150° C. At this temperature the molybdenum powdered particles become covered with a thin oxide film and then combine themselves with the ceramic surface as the melting point drops. A pre-requisite for this reaction is that certain conditions must, of course, be fulfilled within the furnace. An essential requirement is that the oxygen content must be admixed in small amounts to the nitrogen or hydrogen in the furnace. An admixture of pure nitrogen will give somewhat greater reaction, even though it is not satisfactory for vacuum proof hard soldering. On the other hand if the amount of oxygen is too large the reaction between the molybdenum and the ceramic is so powerful that a complete scarification takes place. Moreover, no vacuum tightness will be obtained in such a soldering. In both extreme cases of too weak and too powerful reaction there appear air leakages after soldering, as well as very fine leakage which can be noticed only after a few days. The working conditions in the procedure will be constant only when the preceding operation is performed carefully and in particular when the non-baking temperature is constant since stationary ovens in which the non-baking at uneven temperature distribution in the oven may introduce different reaction phenomenon in the vitrification of the ceramic articles.

While at first glance it might seem that there is not much difference between commercial molybdenum powder and the pyrophoric molybdenum powder used in the process of this invention, closer observation will indicate that there is a difference of kind and not merely of degree. The preparation of commercial powder is normally carried out by grinding and by standard metallic powder handling techniques. The powders so produced are relatively coarse and they have a relatively broad spread in particle size. The result obtained is basic to the method of preparation and cannot be avoided. In order to obtain a fine powder that is suitable for the making of a good metallic metal-to-ceramic seal a very narrow particle size spread of the powder is required. This fineness of spread cannot be obtained by normal standard commercial methods. It has been found, however, that it can be obtained by grinding molybdenum dioxide in a ball mill and then reducing it in a very dry hydrogen atmosphere (to a point below −100° C.), while maintaining the furnace temperature at about 500° with a rapid flow of hydrogen. This produces a powder which has a particle size of about 1/10 micron with an ultra-narrow particle size spread. Powders of this type are suitable for use in the process of this invention.

While the above description and drawing submitted herewith discloses a preferred and practical embodiment of the method and composition for making ceramic-to-metal seals of this invention it will be understood that the specific details of construction and arrangement of parts as shown and described are by way of illustration and are not to be construed as limiting the scope of the invention.

What is claimed is:

1. In the manufacture of a ceramic-to-metal seal which comprises the steps including mixing molybdenum powder with a further metal powder selected from the group consisting of iron and manganese, applying the mixture of powders to a ceramic body at a sealing location, and firing said ceramic body in an oxidizing atmosphere, the improvement which comprises employing molybdenum particles of an average particle size of less than 1.5 microns and a firing temperature of about 1150° C.

2. In the manufacture of a ceramic-to-metal seal which comprises the steps including mixing molybdenum powder with a further metal powder selected from the group consisting of iron and manganese, applying the mixture of powders to a ceramic body at a sealing location, and firing said ceramic body in an oxidizing atmosphere, the improvement which comprises preparing molybdenum particles of an average particle size of less than 1.5 microns by grinding molybdenum dioxide in a reducing atmosphere at a temperature of about 500° C., and employing said molybdenum particles in making said ceramic-to-metal seal at a firing temperature of about 1150° C.

References Cited in the file of this patent
UNITED STATES PATENTS

| | | |
|---|---|---|
| 2,141,677 | Ziegenbein | Dec. 27, 1938 |
| 2,282,106 | Underwood | May 5, 1942 |
| 2,410,717 | Cox | Nov. 5, 1946 |
| 2,592,870 | Geoffrey et al. | Apr. 15, 1952 |
| 2,619,432 | Hosmer | Nov. 25, 1952 |
| 2,667,432 | Nolte | Jan. 26, 1954 |
| 2,687,951 | Whaley | Aug. 31, 1954 |